Oct. 23, 1951 W. A. CUSTER 2,572,451
LIGHTING MEANS AND SYSTEMS FOR AIRPLANE LANDING RUNWAYS
Filed April 8, 1947 7 Sheets-Sheet 1
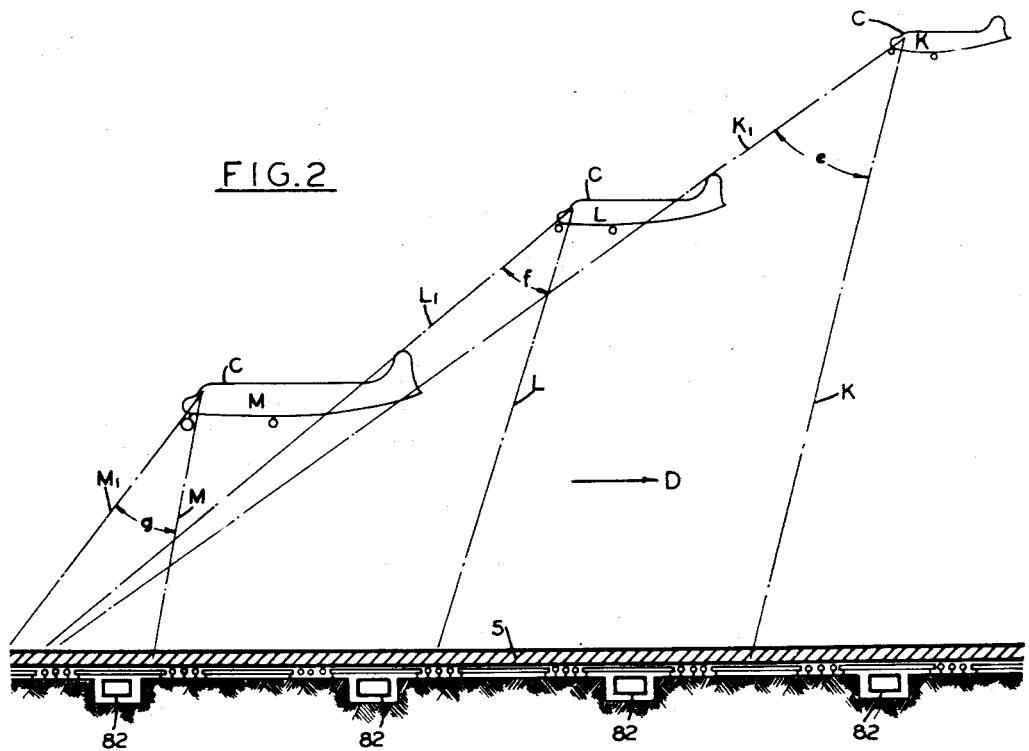
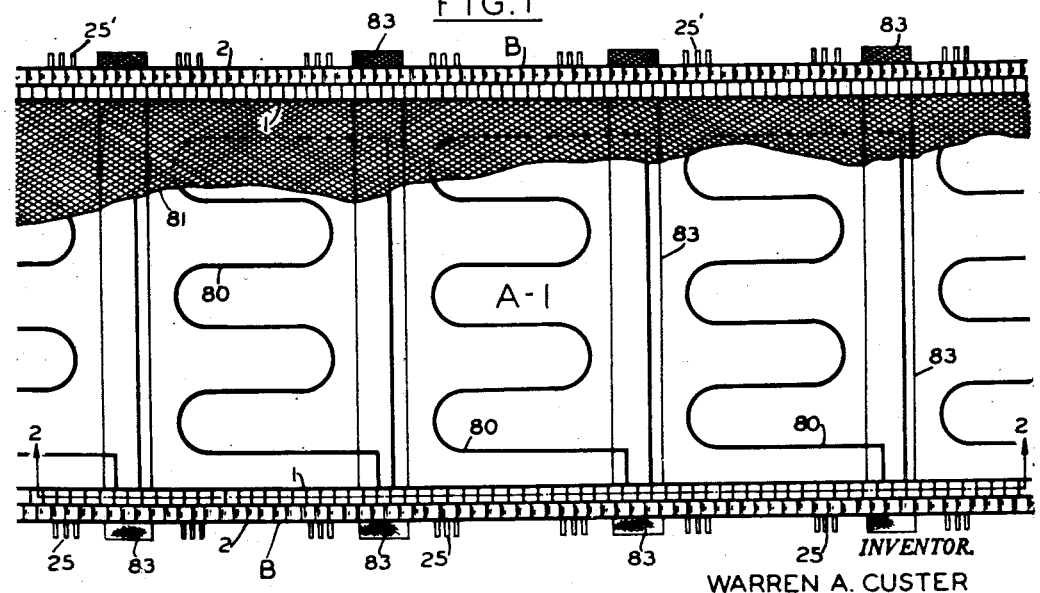
INVENTOR.
WARREN A. CUSTER
BY
Bartlett, Eyre, Keel & Weymouth
attorneys Oct. 23, 1951  W. A. CUSTER  2,572,451
LIGHTING MEANS AND SYSTEMS FOR AIRPLANE LANDING RUNWAYS
Filed April 8, 1947  7 Sheets-Sheet 2

INVENTOR.
WARREN A. CUSTER
BY
Bartlett, Eyre, Keel & Weymouth
attorneys

Oct. 23, 1951 W. A. CUSTER 2,572,451
LIGHTING MEANS AND SYSTEMS FOR AIRPLANE LANDING RUNWAYS
Filed April 8, 1947 7 Sheets-Sheet 3
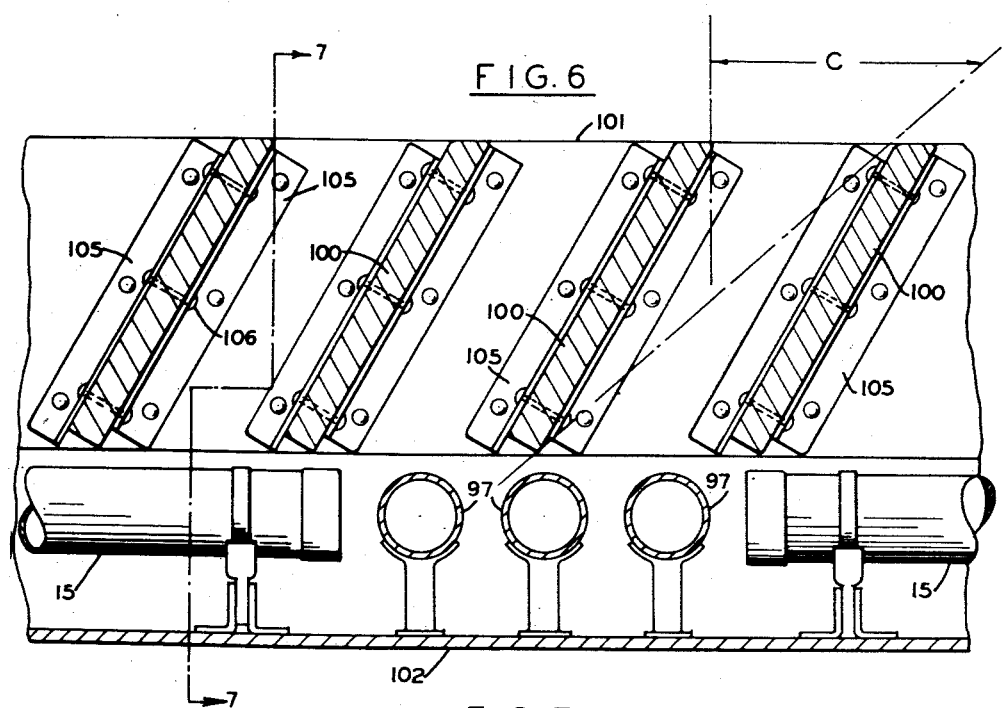
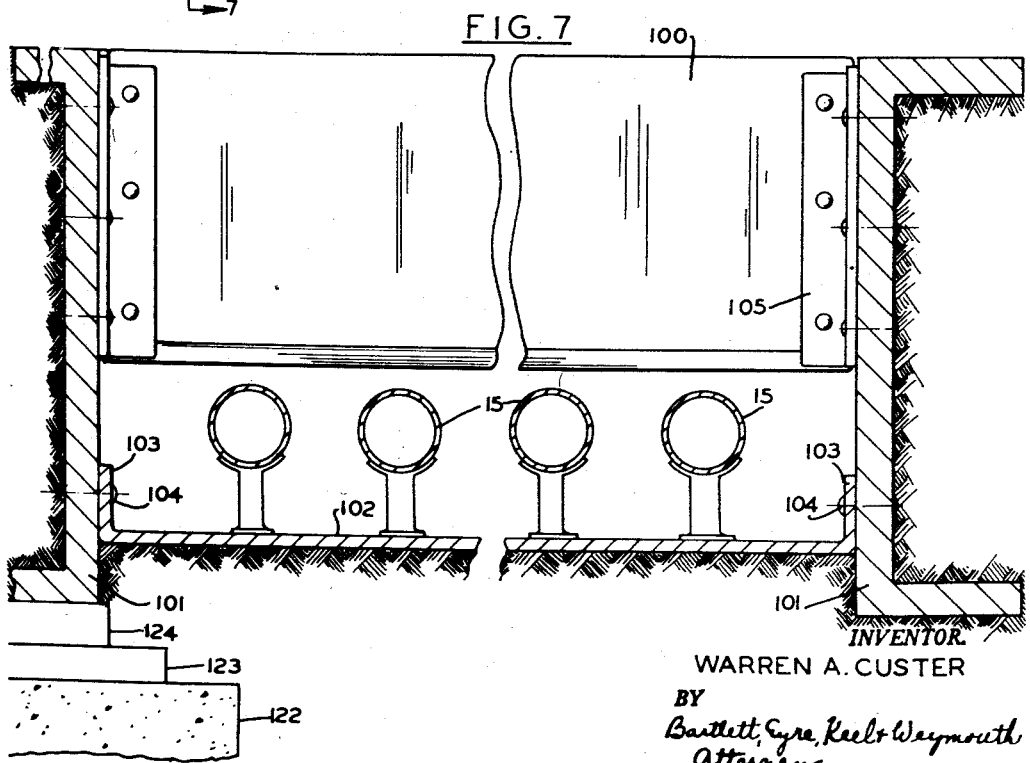
INVENTOR.
WARREN A. CUSTER
BY
Bartlett, Eyre, Keel & Weymouth
Attorneys Oct. 23, 1951 W. A. CUSTER 2,572,451
LIGHTING MEANS AND SYSTEMS FOR AIRPLANE LANDING RUNWAYS
Filed April 8, 1947 7 Sheets-Sheet 4

*INVENTOR.*
WARREN A. CUSTER
BY
Bartlett, Eyre, Keel & Weymouth
*attorneys*

Oct. 23, 1951 W. A. CUSTER 2,572,451
LIGHTING MEANS AND SYSTEMS FOR AIRPLANE LANDING RUNWAYS
Filed April 8, 1947 7 Sheets-Sheet 5
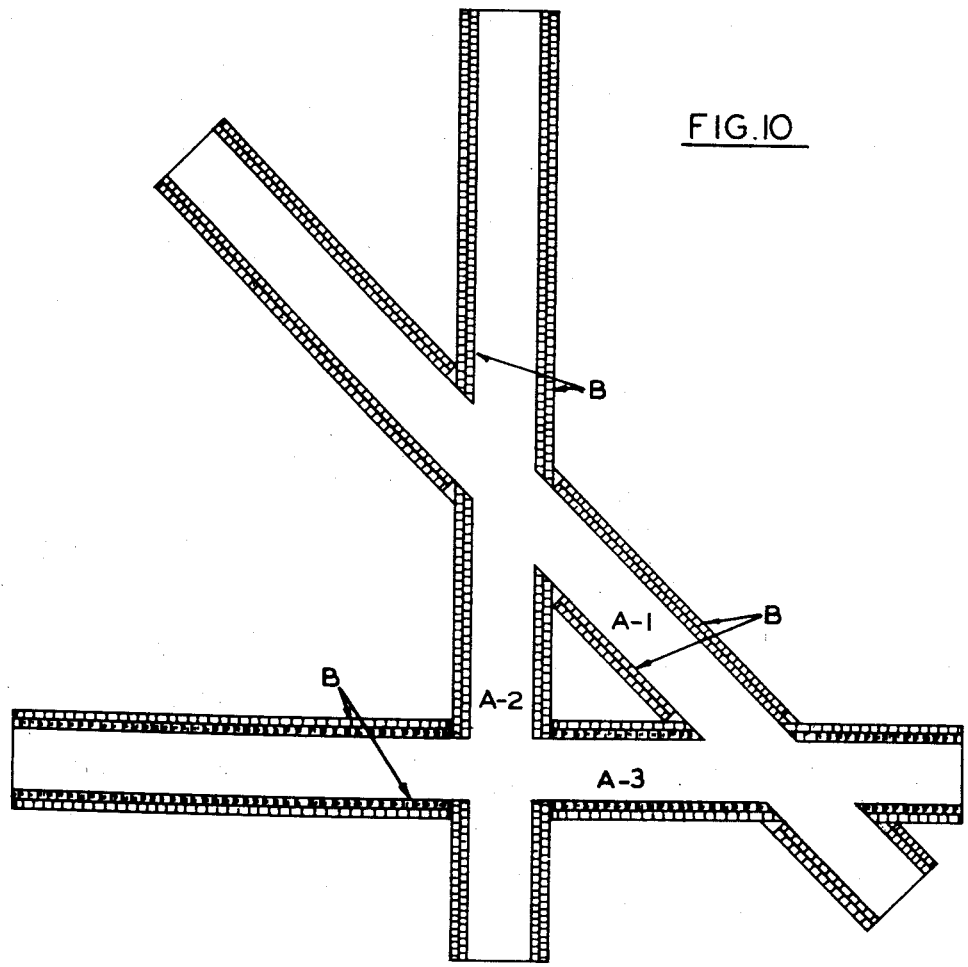
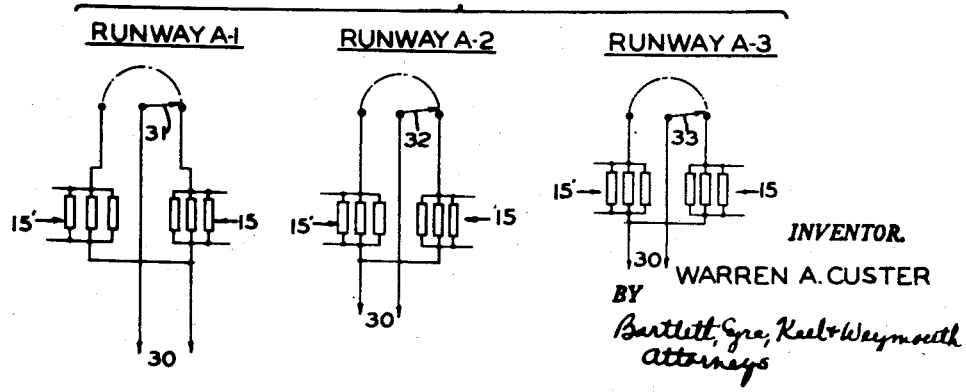
INVENTOR.
WARREN A. CUSTER
BY
Bartlett, Eyre, Keel + Weymouth
attorneys

INVENTOR.
WARREN A. CUSTER

Oct. 23, 1951 W. A. CUSTER 2,572,451
LIGHTING MEANS AND SYSTEMS FOR AIRPLANE LANDING RUNWAYS
Filed April 8, 1947 7 Sheets-Sheet 7

INVENTOR.
WARREN A. CUSTER
BY
Bartlett Eyre, Keel & Weymouth
Attorneys

Patented Oct. 23, 1951

2,572,451

UNITED STATES PATENT OFFICE 2,572,451

LIGHTING MEANS AND SYSTEMS FOR AIRPLANE LANDING RUNWAYS

Warren A. Custer, Newton, Pa.

Application April 8, 1947, Serial No. 740,177

16 Claims. (Cl. 177—352)

1

This invention relates to airfields or ports.

One object of the invention is a novel and improved lighting means and system for aiding pilots of aircraft in landing operations.

A further object of the invention is a lighting means and system for airfields and runways whereby landing operations are rendered safer under adverse conditions such, for example, as conditions of darkness, fog, rain, snow, sleet, dust and smoke.

More particularly the lighting means and system of this invention offers the pilot of an airplane about to land improved visual observation as to his altitude, his angle of approach vertically, his angle of approach laterally, as to which is the runway best suited for landing in relation to the wind, his speed in relation to the ground, and the correct or incorrect direction of approach, and otherwise assists the pilot in making a safe landing and in bringing the craft safely to a stop.

A further object of the invention is a landing strip or runway which may be safely used for landing in extreme weather conditions.

A further object of the invention is a landing strip or runway which is characterized by a traction surface of maximum traction under adverse snow and sleet conditions.

A further object of the invention is a landing strip or runway in which the difficulties due to snow, sleet and ice are minimized.

A further object of the invention is a landing strip or runway of a novel and improved structure for preventing the collection of snow and sleet on the runway and dispelling the same.

A further object of the invention is a landing strip or runway embodying means for dispelling or removing fog from the area immediately above the runway.

A further object of the invention is the provision of means of clearing visual obstructions by fog.

Further objects of the invention will hereinafter appear.

For a better understanding of the invention reference may be had to the accompanying drawings, wherein Fig. 1 is a diagrammatic plan view illustrating one embodiment of the invention;

Fig. 2 is a sectional view along the line 2—2 of Fig. 1;

2

Figure 3A:
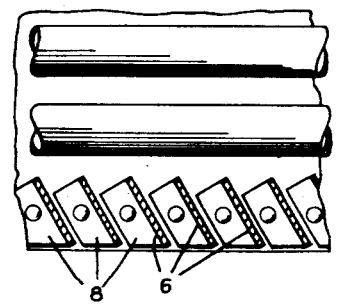
Fig. 3A is a sectional view along the line 3A—3A of Fig. 3.
Figure 3:
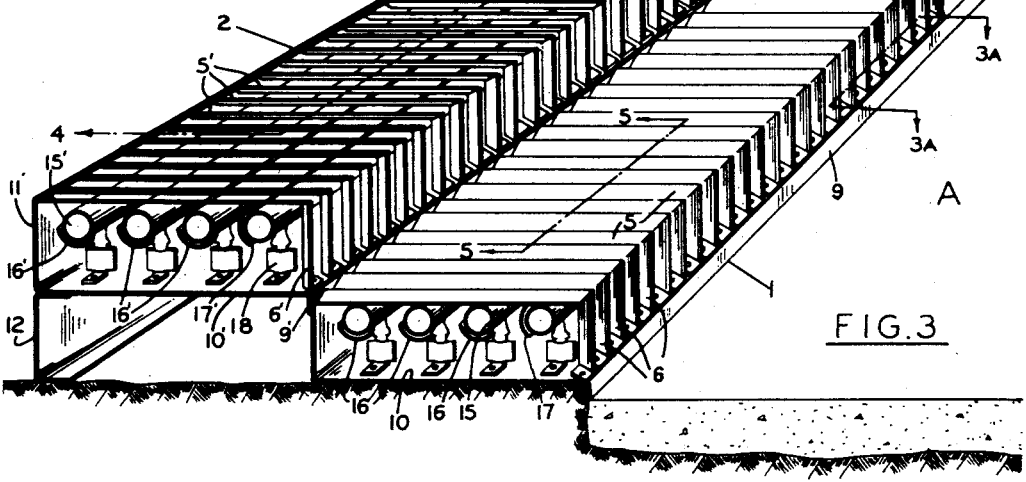
Fig. 3 is a perspective view of a section of the lighting means and system of this invention.
Figure 4:
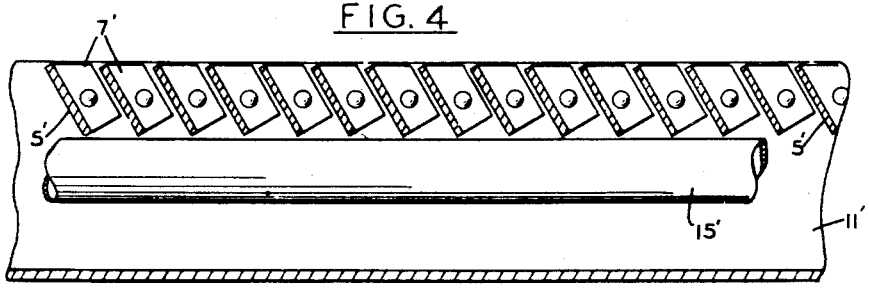
Figure 5:
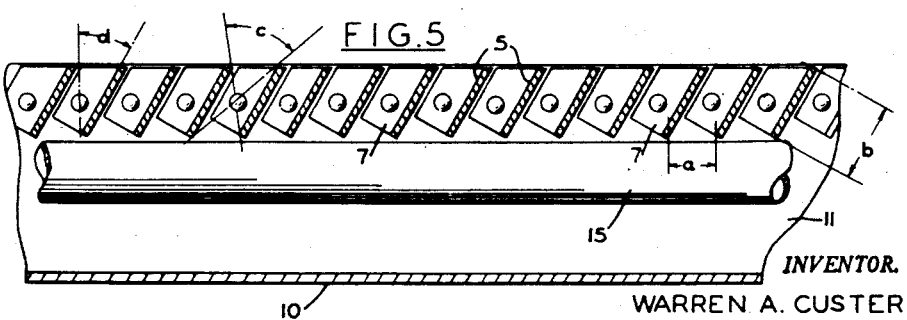
Figure 8:
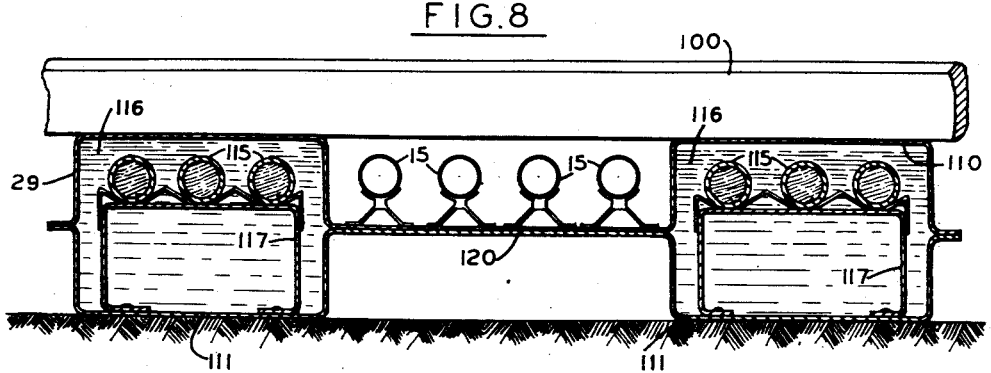
Figure 9:
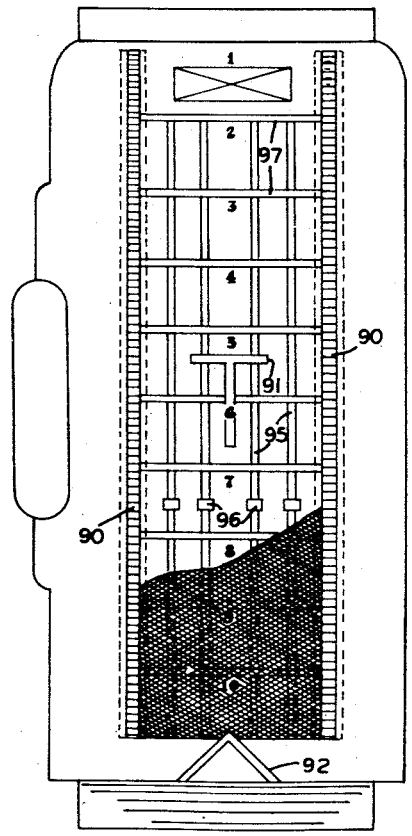
Figure 12:
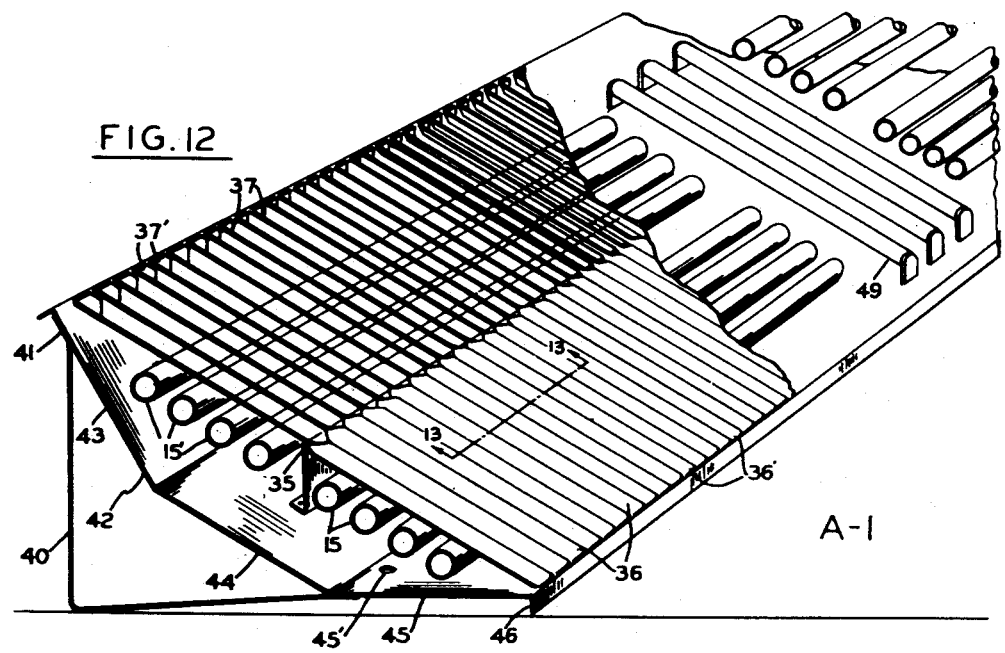
Figure 13:
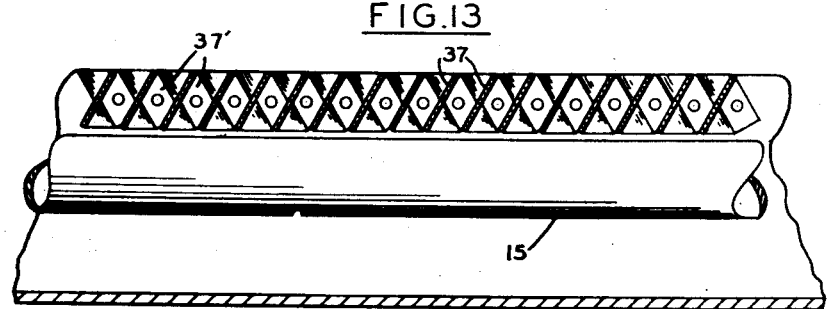
Figure 16:
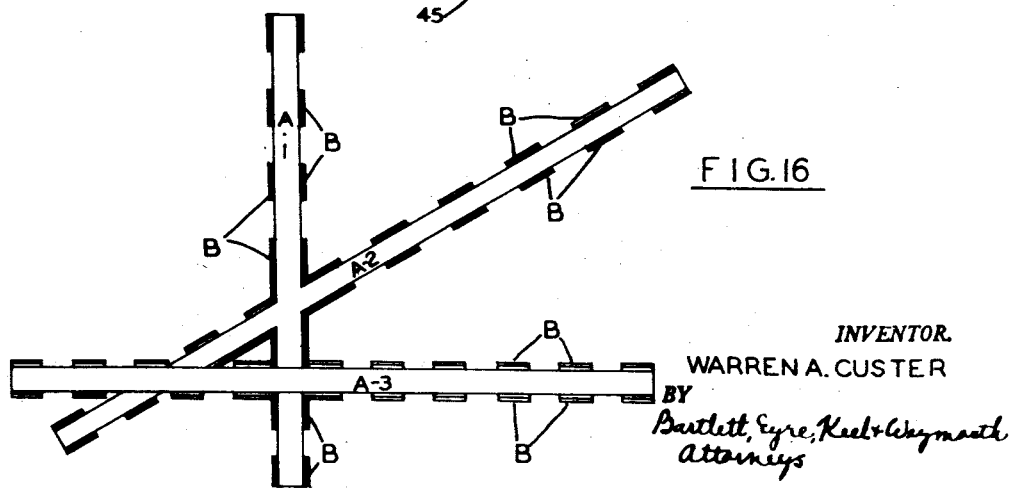
Figure 14:
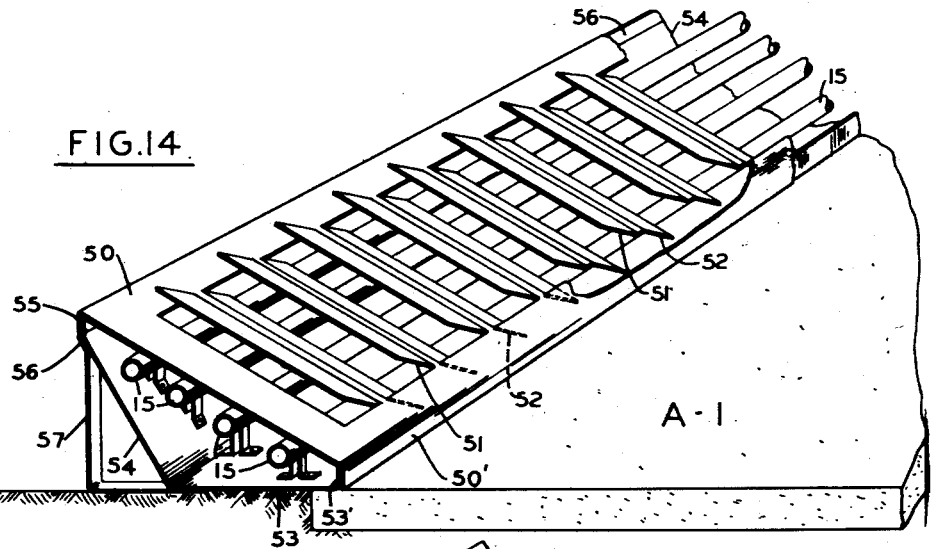
Figure 15:
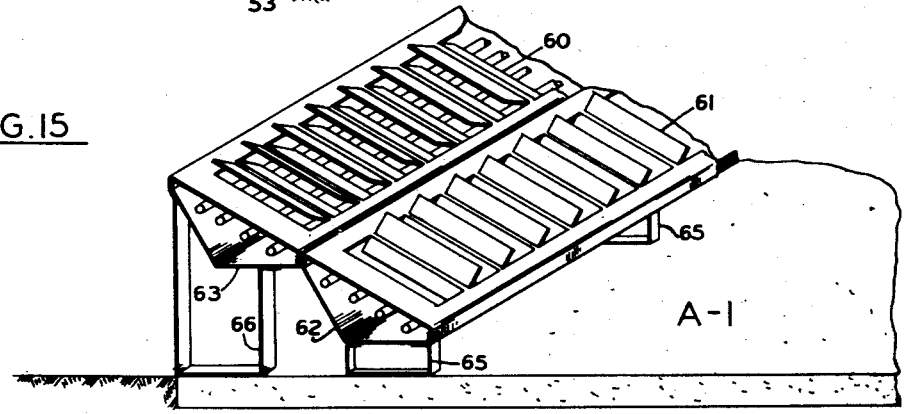
Figure 17:
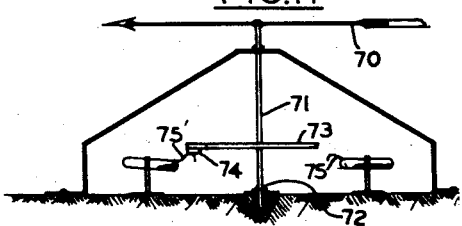
Figure 18:
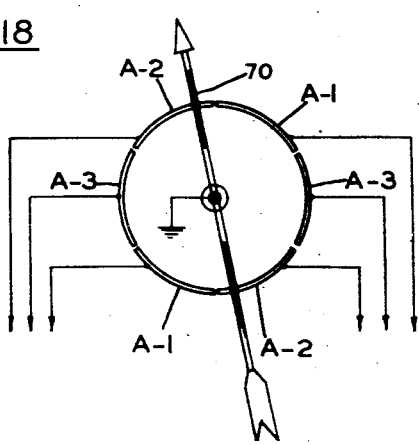

Fig. 4 is a sectional view along the line 4—4 of Fig. 3;

Fig. 5 is a sectional view along the line 5—5 of Fig. 3;

Figs. 6 and 7 are sectional views at right angles to each other embodying the combined runway and lighting means of the invention with Fig. 7 taken along the line 7—7 of Fig. 6;

Fig. 8 is a modification of the invention illustrated in Figs. 6 and 7;

Fig. 9 is a diagrammatic plan view of an aircraft carrier having the runway constructed in accordance with Fig. 8;

Fig. 10 is a diagrammatic plan view of an airfield or port wherein the modification of Figs. 1 to 5 is utilized;

Fig. 11 is a lighting circuit diagram for the different runways;

Fig. 12 is a perspective view of a modification of the invention illustrated in Figs. 1 to 5;

Fig. 13 is a sectional view along the line 13 of Fig. 12;

Fig. 14 is a plan view of an airport or field illustrating diagrammatically a modification of the field illustrated in Fig. 10;

Fig. 15 is a perspective view of a further modification of the invention of Figs. 1 to 5;

Fig. 16 is a perspective view of a further modification of the invention of Figs. 1 to 5;

Fig. 17 is a diagrammatic view of automatic means for selecting the desired runway for landing;

Fig. 18 is a circuit diagram for the lighting means of the different runways controlled by the means of Fig. 17.

Referring to Fig. 1 I have illustrated my invention as applied to a landing strip or runway A-1. The lighting means and system of my invention is disposed along the sides of the landing strip or runway A-1 and comprises the lighting means B restricted along the sides of the runway. In the particular embodiment shown the lighting means B is illustrated as continuous along the runway A-1. In this embodiment the lighting means B for the opposite sides of the runway are similar and the description of one of these will suffice for both. Each comprises an inner longitudinally extending part 1 and an outer longitudinally extending part 2 and in the particular embodiment shown these parts 1 and 2 are disposed closely adjacent each other.

Each of these longitudinally extending parts 1 and 2 comprises a series of light directing vanes erected at intervals, preferably regular intervals, and so inclined from the vertical and horizontal and so spaced in relation to one and another, with a suitable light source or sources cooperating therewith, that the light emitted or transmitted to a pilot of an aircraft is visible only in accordance with predetermined conditions. Each of the vanes or part 1 is designated by the numerals 5 and 6, the numeral 5 designating one portion of the vane and the numeral 6 designating another portion of the vane. In the particular embodiment shown the numeral 5 designates horizontally disposed portions of the vanes and the numeral 6 designates vertical portions of the vanes, the portions 5 of the vanes in the embodiment being substantially longer than the vertical portions 6 thereof. The vanes are spaced from each other a distance $a$ (Fig. 5). The width of the vanes is indicated at $b$ (Fig. 5). With a suitable light source below the vane portions 5, the spacing $a$ of the vanes and their heights or widths $b$ determine the angle $c$ within which the light is visible from above through any particular pair of adjacent vanes 5 (Fig. 5). Also the vane portions 5 make an angle $d$ to the vertical (Fig. 5).

The particular spacing, vane width and angle of inclination to the vertical are chosen in practice to suit the particular operating conditions desired. The direction of inclination of the vane portions 5 is such that the light of the lighting means is visible to the pilot underneath or forward of the plane only if the plane is approaching the landing runway or strip against the wind. For example, with the wind direction illustrated at D in Fig. 2, the pilot of a plane C must head into the wind D or substantially in the head of the wind D in order to see any substantial portion of the elongated lighting means ahead of him. If the pilot should approach the field in the direction of the wind all of the direct light from the light source or sources issuing from the inclined vanes in advance of the plane would be blocked by the vanes. The vane spacing, vane width and vane height are chosen in practice to suit predetermined conditions as, for example, say that when the plane C is in the position K of Fig. 2, the direct light from the source or sources beneath the vane portions 5 is visible to the pilot of the plane only through the section or length of the parts 1 of the lighting means indicated by the angle $e$, and similarly with the plane at the point L that section of the lighting means 1 visible by direct light to the pilot is determined by the angle $f$ and when the plane C is at the point M a still smaller section or length of the parts 1 of the lighting means is only visible by a direct light through the still shorter section or length thereof as indicated by the angle $g$. The lower the plane the shorter the length or section of the lighting means that is visible by direct light to the pilot. This enables the pilot to check his altitude in approaching the runway for landing. The greater the height of the plane, the longer the section of the lighting means ahead of the plane which is visible by direct light to the pilot. The pilot is always able to see direct light from a point ahead of the plane from the lighting means B. As the plane decreases in altitude and approaches the landing runway the pilot is not only aided by the direct light visible between the vanes but as described below he is also assisted by light laterally from the lighting means on the runway and above the runway within a limited range. This lighting arrangement and system also enables the pilot to determine the approaching path of the plane with the vertical plane or planes extending longitudinally of the runway A-1.

The vane portions 5 and 6 are preferably formed integrally with the vertical portions 6 disposed at right angles to the horizontal portions 5 and in the particular embodiment shown the vertical portions 6 of the vanes have the same inclination to the horizontal that the vane portions 5 have to the vertical although these vane portions may have different inclinations. The inclination of the vertical portions 6 of the vanes in the direction of the on-coming plane permits light to pass outwardly and horizontally to the runway A-1 to light the latter up and these vertical vane portions 6 also permit a certain quantity of direct light to pass outwardly and upwardly above the horizontal.

The vanes 5, 6 may be mounted in any suitable manner but in the particular embodiment shown they are mounted upon a frame member as, for example, of sheet metal having a horizontal portion 10 mounted on the ground and a vertical portion 11 formed by bending the portion 11 at right angles to the horizontal portion 10. The ends of the horizontal portions 5 are formed with attaching webs or feet 7 which are fastened to the vertical portion 11 of the frame supporting member as, for example, by riveting. The other ends of the vanes, namely the ends of the vertical portions 6 of the vanes are provided with similar feet or web fastening devices 8 for attachment to the sheet metal frame 10 as, for example, by riveting.

Any suitable light source or sources may be employed beneath the horizontal portions 5 of the vanes. In the particular embodiment shown these light sources are in the form of lighting tubes 15 extending lengthwise of the lighting means part 1 and these may be of any suitable type as, for example of the fluorescent type furnishing light both upwardly between the horizontal vane portions 5 and laterally between the vertical vane portions 6. If desired reflecting means may be provided for reflecting the light up between the vane portions 5 or laterally between the vane portions 6. If a reflecting or projecting means is desired to project light out between the vertical vane portions 6, the outer lamp means 15 may be used for this purpose. I have illustrated diagrammatically at 16 a reflecting means for the three innermost tubes 15 and the reflecting means 17 for the outermost tubes 15 for projecting light laterally between the vane portions 6.

The lighting means part 2 extending longitudinally along the runway with the lighting means part 1 is as above indicated, of the same general structural nature as that of the lighting means part 1. The horizontal portions 5' of the vanes are oppositely inclined to the direction of inclination of the corresponding horizontal vane portions 5 of the lighting means part 1 as is clear from Figs. 3, 4 and 5. For convenience in illustration I designate the vane structure of the lighting means part 2 with the same numerals employed in the lighting means part 1 but distinguished by primes. The vane structure of the lighting means part 2 is mounted on a frame member 10' having a flange 9' at the inner end fastened in any suitable manner to the vertical frame portion 11 and near the upper edge thereof. The supporting frame for the vanes 5' and 6' is also provided with an upstanding part 11' which is disposed substantially at right angles to the frame portion 10'. The outer edge of the frame portions 10', 11' is supported by a U frame member 12. The vanes 5', 6' may be fastened to the frame 10', 11' similarly to the fastening of the vane portions 5, 6 as described above. Any suitable source of lighting means may be provided underneath the vane portions 5' as, for example, the tubular light source 15'. Suitable reflecting means 16' is diagrammatically indicated underneath three of the tubes 15' for projecting the light upwardly from the source and between the vane portions 5'. The inner tube source 15' is illustrated diagrammatically as provided with a reflecting means 17' arranged to project the light therefrom in a lateral direction, both horizontally and above the horizontal between the vane portions 6'. I have illustrated diagrammatically at 18 means for insulatedly supporting the lighting tube sources 15 and 15'. The lighting source consists of sections extending longitudinally of the lighting means B and two of the sections 19 and 20 are illustrated in Fig. 3.

The runway A-1 is used for landing when the wind is in one direction or a direction opposite thereto. The lighting means part 1 is lighted when the wind is in the direction of the inclination of the vane portions 5 which corresponds to Fig. 2, and part 2 when the wind is in the opposite direction.

In addition to the light sources 15 and 15' each of the lighting means parts 1 and 2 is provided with sources of light regularly spaced longitudinally of the lighting means B. These light sources are indicated at 25 and 25'. These light sources are preferably regularly spaced with equal distances therebetween and they are spaced so as to outline the runways to the pilot and afford him a means of determining the position and the amount and degree of the restriction of the extent of the direct visible light from the light sources and between the vanes. In the particular embodiment shown these light sources are illustrated as groups of three tubular light sources but any other form of suitable light sources may be used for this purpose.

In Fig. 10 I have illustrated my lighting means and system as incorporated in three runways A-1, A-2 and A-3. The lighting means B for each of these runways are distributed in a continuous manner along the runways except for the gaps where the runways cross each other. My lighting means and system B may be incorporated in the runways of any other conventional relative arrangement of runways. In Fig. 11 I have illustrated circuit diagrams for controlling the light sources 15 and 15'. The light sources 15 and 15' are illustrated for each of the runways A-1, A-2 and A-3. These are supplied with energy from an A. C. source 30 and switches 31, 32 and 33 are illustrated for connecting either of the lamp means 15 or 15' in circuit at will.

In Fig. 16 I have illustrated a plan view of an airport showing three runways A-1, A-2 and A-3. In this embodiment the lighting means B are illustrated in sections spaced from each other. The lighting means B of these runways may be of the embodiments shown in Figs. 1 to 5 and described above or they may be like the embodiments illustrated in Figs. 12 to 15. By spacing the lighting means in groups at regular and equal intervals along the runway the use of the separate spaced lighting means 25 and 25' may be dispensed with.

In the embodiments of Figs. 1 to 5 the vane groups 5', 6' are elevated above the vane groups 5 and 6 with the vertical portions 6' and 6 of the vanes furnishing lateral lighting on and above the runway.

In the embodiment of Figs. 12 and 13 this same general arrangement is embodied but the vanes corresponding to the vanes 5, 6 and 5', 6' are integrally formed and are supported so as to be inclined to the horizontal with their lowermost ends approaching the level of the runway A-1. The vanes are formed of integral sheets of metal or other suitable material and are twisted at their intermediate points 35 so as to have inner portions 36 which are inclined to the vertical in one direcion and porions 37 which are inclined to the vertical in the opposite direction, these inclinations corresponding to the reversed inclinations of the vanes of Figs. 1 to 5. Each of the vanes 36, 37 is supported so as to be inclined downwardly toward the runway and the vanes may be supported in any suitable manner. The supporting means which is diagrammatically illustrated comprises an L-shaped member 40 having a vertical part and a substantially horizontal part, the vertical part being attached at 41 to a sheet metal member 42, the latter having a portion 43 extending upwardly to which the upper ends of the vanes 37 are attached, an intermediate portion 44 and a substantially horizontal portion 45 to which the outer ends of the vanes 36 are attached. The portion 45 has a flange 46 resting on any suitable supporting means. The vane parts 37 are provided with feet or webs 37' for attachment to the support 43 and the vane parts 36 are provided with similar feet or webs 36' for attachment to the support part 45. The fastening may be effected by welding or as shown in the drawings by riveting. 45' is a drainage hole.

In this embodiment the vane portions 36 perform the combined functions of the vane portions 5, 6 of the embodiment of Figs. 1 to 5 while the vane portions 37 perform the combined functions of the vane portions 5', 6'. That is, they give to the pilot the information desired as to wind direction, the runway to select for landing and all other information given by the embodiment of Figs. 1 to 5. The downward inclination of the vanes in Figs. 12 and 13 toward the runway results in direct light being transmitted from the sources 15, 15' directly laterally over the runway and also upwardly. In this embodiment one group of the regularly spaced lighting means is shown at 49 and these lighting groups function cooperatively with the other lighting means as described above with respect to the regularly spaced lighting groups or means 25 and 25'.

In the embodiment of Fig. 14 I have illustrated the vanes inclined to the horizontal and downwardly toward the runway A-1, as shown in the embodiment of Fig. 12. Here only one of the two sets of vanes is illustrated. In this embodiment the vanes are formed from one piece of material such as metal or other suitable material, namely a sheet of matrial 50. Parts of this sheet spaced at equal distances are cut from the sheet to form the vanes. One half of a vane 51 is cut on three sides and turned upwardly while another part 52 adjacent the first part 51 is cut on three sides and turned downwardly, the two parts 51 and 52 forming one vane disposed at the desired inclination. The integrally formed vanes and the sheet 50 from which they are formed may be supported in the inclined position in any suitable manner as, for example, by being fastened to a sheet supporting member having a horizontal portion 53 and an upwardly extending portion 54. The portion 53 has a flange 53' fastened in any suitable manner as, for example, by welding to a flange 50' formed on the sheet 50. The elevated side of the sheet 50 is provided with a down-turned flange 55 which is fastened in any suitable manner as, for example, by welding to an upwardly extending vertical portion 56 of the supporting part 54. An L-shaped frame member 57 has its two legs fastened respectively to the frame parts 53 and 54. This structure has the advantages of low cost in construction.

In the embodiment of Fig. 15 the vanes are constructed from single sheets of material as described with respect to Fig. 14 and in the same manner but here there are two sets of adjacent vane structures with the vanes 60 reversely inclined with respect to the vanes 61 so as to provide for landing in opposite directions depending upon the direction of the wind. The vane group 61 is directly supported by a frame member 62 similar to the frame members 53 and 54 (Fig. 14) and the vane group 60 is directly supported by a similar support 63. The support 62 is elevated slightly above the level of the runway and supported in this position by frame support 65. The vane group 60 is supported at a still higher elevation by the supports 66.

In Figs. 17 and 18 I have illustrated an automatic means which, responsively to the wind direction, connects the proper runway to be lighted up for landing. This comprises a wind vane 70 mounted on a vertical shaft 71 which is freely mounted for rotation about a bearing 72. This shaft 71 carries a contact arm 73 which is provided with a contact 74, this contact 74 and the arm 73 being one side of the circuit to be completed to light up the light source. This contact 74 as it is moved around by the arm 73 in accordance with the wind direction makes contact with another contact 75 which completes the circuit for lighting up the runway which is to be used when the direction of the wind is as indicated by the weather vane 70. For each runway there are two alternative circuits to be completed, one for the lighting means 1 and the other for the lighting means part 2. Thus the segments in Fig. 18 designate A-1, A-2 and A-3 respectively of the runways to be lighted up. If the runway A-1 is to be lighted up then one of the A-1 contact segments is to be contacted depending upon the direction of the wind, and similarly with respect to the segments A-3 and A-2. The use of existing electrical devices such as a time delay relay may be inserted so as to eliminate any absence or overlapping of illumination of the lighting means A-1, A-2 and A-3.

In the embodiment of Fig. 1 I have illustrated a source of heat designated generally by the numeral 80, this being disposed beneath the runway grid surface 81 and consisting of pipes carrying a heat exchange medium to transfer by either radiant or contact means sufficient heat to dispel fog, snow or ice as conditions might require. The generating source or means 82 may be of any conventional arrangement depending on fuel or preference and located in suitable bays 83.

In Fig. 9 I have illustrated the invention applied to the deck of an aircraft carrier. Since the carrier is always headed in the direction of the wind for aiding the planes in landing on the craft the lighting means comprises only one set of vanes covering the light source for either side of the deck runway and these two sets of vanes are inclined to the vertical in the same direction. These inclined vanes are shown at 90 and are disposed wholly to the side of the main runway. It is understood that these vanes 90 may be of the structure and arrangement of the vanes 5, 6 of Fig. 3 or they may be of the structure and arrangement of Figs. 12, 13 and 14. The letter T designated by the numeral 91 and disposed in the particular embodiment intermediate the bow and the stern of the carrier represents a non-directional source of light. Its purpose is to give the pilot the code designation of the carrier. Instead of vanes or guards at this portion of the runway there would be round tubes of sufficient structural strength to support the needed weight. The V designated by the numeral 92 at the stern is another such light source but here this light source 92 is intended to aid the pilot in alining his plane so as to land on the stern. The numerals 1, 2, 3, 4, 5, 6, 7, 8, 9 and 10 on the carrier are for the purpose of indicating to the pilot of the aircraft about to land his position in relation to the flight deck so that he will known the distance in which he must bring his airplane to a stop.

At 95 I have illustrated heating pipes for heating the deck of the carrier for purposes of clearing the deck of snow and ice. These may be steam pipes or the like. At 96 I have illustrated manholes to afford access to the heating means. The transversely extending means illustrated diagrammatically at 97 are light sources visible to the pilot for the same purpose as the numbers but for use when a non-directional means of light would be more advantageous such as under conditions of darkness or low visibility. These can be coded as to color, so as to be green at positions 10, 9 and 8 and varying to red at positions 4, 3 and 2.

The embodiment of Figs. 6 and 7 incorporates the vane structures of my invention as a trackway upon which the planes may be landed. The vanes are indicated at 100 and these must be of sufficient strength and supported in sufficiently firm manner to function as a runway. They are firmly attached at their ends to side frame members 101, these being of U shape in the particular embodiment shown. The frame members 101 are rigidly fastened as a unit by means of the transverse frame member 102 which is provided with flanges 103 at its end and these flanges are rigidly fastened to the frame members 101 as, for example, by the riveting 104 illustrated. The vanes are fastened at their ends to the frame members 101 by means of angle-shaped brackets 105, these angle brackets 105 having their sides disposed at right angles and the sides of these brackets are rigidly fastened respectively to a frame member 101 and to the side at the ends of the vanes 100. In this particular embodiment shown they are firmly fastened together by the rivets 106. These parts are assembled and fastened together so that the upper edges of the vanes 100 are flush with the upper edges of the frame members 101. Supported beneath the vanes are the lighting sources 15 described above. These lighting tubes 15 are in groups and sections and intermediate the groups are the crosswise marker lighting sources 97. This embodiment of the invention is particularly advantageous in that it not only embodies important features of my improved lighting means and system but it also forms the traction surface of the runway whether it is the deck of an aircraft carrier or on a stationary field.

Frame members 101 may be supported by piers, footings or pilings 122 with bearing plate 123 and adjustable shims 124 that can be inserted so as to maintain the runway surface structure on a suitable plane so as to compensate for any variance due to change in ground surface after installation. This embodiment is particularly applicable to installations on filled land or otherwise unstable surfaces.

In the embodiment of Fig. 8 I have illustrated the structural vane members 100 of the runway mounted on supports 110, these supports 110 being illustrated diagramamtically as having been formed from a continuous metallic sheet or supporting member. The supports 110 are in turn illustrated as carried by a reversed similar structure 111, the portions 111 being mounted on a suitable base. Each pair of supports 110 and 111 houses heat distributing means 115, illustrated as tubes. These heating tubes convey a suitable heat medium from a heat generating source (omitted for convenience in illustration) and transfer the heat energy by radiation to the fluid or other medium 116 in the enclosures formed by the supports 110 and 111. This arrangement has the advantage of efficiently dispensing the heat supplied by the heating means for facilitating the removal of ice and snow from the runway. This heating means also provides for increasing the temperature of the atmosphere to dispel fog if desired. The pipes 115 are supported by the bracket members 117. The supports 110 and 111 are formed with a shelf 120 intermediate the level of the supports 110 and 111 and upon this shelf are carried the lighting tubes 15.

The structural vanes 100 of the embodiments of Figs. 6, 7 and 8 function also as arresting means for arresting or retarding the run of the craft on landing. For example, with suitable arresting gear extending downwardly from an airplane the vanes 100 are in a position to engage the hook or other engaging part of the arresting gear and preferably the arresting gear would in this case embody a yielding connection between the hook or other engaging means and the plane structure so as to minimize shock. The grid 81 of Fig. 1 may be of the general type of structural grid shown in Figs. 6, 7 and 8 so as to provide a convenient and satisfactory means for contacting and securing the arresting hook or the anchoring means lowered from the airplane during the landing operation.

The lighting means and system of this invention as above set forth has the advantages above indicated in contributing a substantially greater degree of safety to airplanes in landing which is one of the critical periods of operation of a plane. A pilot is not only enabled to select the right landing strip or runway upon which to land but he is able to observe also the direction he must land, namely a direction which is against the wind and which is visibly shown to him by the lighting means and system of this invention. When visibility permits he may observe by the naked eye the landing conditions he must observe and he may also check his ground speed as well as his elevation as, for example, by observing the travel of the visible length of the lighting means along the distance indicating lighting markers which are also placed along the landing strip. The invention also enables the pilot to check his angle of approach both vertically and horizontally. In cases where visibility is too low to permit reliable observations by the naked eye the craft may be provided with suitable means for detecting the position of the proper landing strip relatively to the plane, the angle of direct light or length of the strip which would otherwise be visible to the naked eye, whether this length is forward of or behind the plane and other required landing conditions. These detecting means form no part of the present application.

The applicant's invention has all of the advantages above indicated and others inherent therein.

It is understood that the embodiments of the invention illustrated herein are for purposes of illustration and not for limitation. For example, the lighting means 1 and 2 of the embodiment of Figs. 1 to 5 instead of being elevated above the level of the runway may be substantially flush therewith. Other changes and modifications may be made without departing from the spirit of the invention which is not to be limited to any particular arrangement except as may be particularly specified in the claims.

I claim:

1. A lighting system and means for an airplane landing strip comprising a multiplicity of closely disposed light directing and shielding vanes distributed throughout the greater portion of the landing strip, said vanes being disposed at an angle to the direction of the landing strip and having their planes inclined to the vertical in one direction so as to permit the passage of light from sources of light disposed therebeneath in upward directions inclined in the direction of the strip and to shield upwardly directed light inclined in the opposite direction, the direct light from the light sources being observable to a pilot of a plane approaching in the direction of the strip in one direction but shielded from the pilot of a plane in the other direction of approach with the length of the lighting means observable to the pilot varying directly with the height of the plane and the visible length of the lighting means shifting in the direction of the movement of the plane in accordance with the actual relative ground speed thereof.

2. A lighting means and system for an airplane landing strip comprising a multiplicity of spaced light directing vanes disposed transversely of the direction of the strip and distributed therealong with the light directing vanes being inclined to the vertical and in the same direction, and sources of light disposed underneath the vanes.

3. A lighting means and system for an airplane landing strip comprising a multiplicity of spaced light directing vanes disposed transversely of the direction of the strip and distributed therealong and comprising one set of vanes inclined to the vertical in one direction and another set adjacent thereto inclined to the vertical but in the reverse direction with respect to the first set and light source means disposed beneath said vanes.

4. A lighting means and system for an airplane landing strip comprising a multiplicity of spaced light directing vanes disposed transversely of the direction of the strip and distributed therealong and comprising one set of vanes inclined to the vertical in one direction and another set adjacent thereto inclined to the vertical but in the reverse direction with respect to the first set and light source means disposed beneath said vanes, said sets of vanes being disposed along either side of the landing strip.

5. A lighting means and system for an airplane landing strip comprising a multiplicity of spaced light directing vanes disposed transversely of the direction of the strip and distributed therealong with the light directing vanes being inclined to the vertical and in the same direction and sources of light disposed underneath the vanes and other lighting means spaced at intervals along the landing strip to provide additional illumination for the strip.

6. A lighting means and system for an airplane landing strip comprising a multiplicity of spaced light directing vanes disposed transversely of the direction of the strip and distributed therealong with the light directing vanes being inclined to the vertical and in the same direction, said vanes being arranged in groups spaced from each other along the landing strip and sources of light disposed underneath the vanes.

7. A lighting means and system for an airplane landing strip comprising a multiplicity of spaced light directing vanes disposed transversely of the direction of the strip and distributed therealong and comprising one set of vanes inclined to the vertical in one direction and another set adjacent thereto inclined to the vertical but in the reverse direction with respect to the first set, said sets of vanes being disposed at different levels and light source means disposed beneath said vanes.

8. A lighting system and means for an airplane landing strip comprising a multiplicity of closely disposed light directing vanes distributed along the landing strip, said vanes being arranged to permit the passage of light from sources of light disposed therebeneath in upward directions inclined in the direction of the strip and to shield upwardly directed light inclined in the opposite direction, said vanes also being adapted to permit lateral distribution of direct light from said sources.

9. A lighting system and means for an airplane landing strip comprising a multiplicity of closely disposed light directing vanes distributed along the landing strip, said vanes being arranged to permit the passage of light from sources of light disposed therebeneath in upward directions inclined in the direction of the strip, and to shield upwardly directed light inclined in the opposite direction, said vanes being disposed beside the landing strip and having horizontal portions inclined to the vertical and end portions inclined to the horizontal.

10. A lighting system and means for an airplane landing strip comprising a multiplicity of closely disposed light directing vanes distributed along the landing strip, said vanes being arranged to permit the passage of light from sources of light disposed therebeneath in upward directions inclined in the direction of the strip and to shield upwardly directed light inclined in the opposite direction, said vanes being disposed along beside the landing strip with the planes of the vanes inclined to the vertical and the ends of the vanes toward the strip being at a lower level than the outer ends of the vanes, said vanes having their innermost parts inclined to the vertical in one direction and their outermost parts inclined to the vertical in the opposite direction.

11. A lighting system and means for an airplane landing strip comprising a multiplicity of closely disposed light directing vanes distributed along the landing strip, said vanes being arranged to permit the passage of light from sources of light disposed therebeneath in upward directions inclined in the direction of the strip and to shield upwardly directed light inclined in the opposite direction, said vanes forming at least a portion of the surface of the landing strip.

12. A landing runway for airplanes comprising a grid landing surface having transverse vanes with the planes of the vanes inclined to the vertical in one direction so as to shield the direct light from light sources therebeneath in one direction but to expose the light sources to a craft approaching in the opposite direction and heating means disposed below the vane structure for the purpose set forth.

13. In a lighting means and system of the character set forth in claim 3 the provision of control means for energizing the light sources for the two sets of vanes and preventing the lighting of the sources for the other set.

14. Visual means for indicating to the pilot of an aircraft the elevation of the craft and the relative ground speed thereof comprising an elongated strip of spaced light directing and controlling vanes, said vanes being arranged to permit sources of light disposed therebeneath to be observable by direct light to the pilot with the visible length of the strip varying directly with the height of the craft and advancing in exact accordance with the relative ground speed and visible distance markers disposed along the strip.

15. A lighting system and means for an airplane landing strip comprising a multiplicity of closely spaced parallel vanes disposed along at least one side of the landing strip and inclined in the direction of said strip, and lighting means beneath said vanes and extending the entire length of the vane structure whereby the light emitted in an upward direction from the light source is inclined at an angle of less than 90° and in a direction of the length of the runway and observable to an incoming pilot when approaching the strip in one direction only.

16. A lighting system and means for an airplane landing strip in accordance with claim 15 wherein at least two sets of reversely positioned vanes extend along at least one side of a landing strip and means responsive to wind direction to illuminate one or the other sets of the vanes to indicate to incoming pilots the directions of the landing strip and the proper direction of approach to said landing strip.

WARREN A. CUSTER.

REFERENCES CITED

The following references are of record in the file of this patent:

UNITED STATES PATENTS

| Number | Name | Date |
| --- | --- | --- |
| 929,627 | Penney | July 27, 1909 |
| 973,904 | Affelder | Oct. 25, 1910 |
| 1,342,860 | Mortimer et al. | June 8, 1920 |
| 1,439,060 | Bowen | Dec. 19, 1922 |
| 1,601,766 | Peter | Oct. 5, 1926 |
| 1,776,111 | Donaldson | Sept. 16, 1930 |
| 1,860,685 | Morris | May 31, 1932 |
| 1,941,503 | Villiers | Jan. 2, 1934 |
| 2,155,295 | Bartow | Apr. 18, 1939 |
| 2,212,537 | Coulter | Aug. 27, 1940 |
| 2,350,407 | McDowell | June 6, 1944 |
| 2,378,823 | Bartow | June 19, 1945 |
| 2,390,109 | Liebmann | Dec. 4, 1945 |
| 2,407,949 | Corcanges | Sept. 17, 1946 |